United States Patent
Lapujade et al.

(10) Patent No.: US 10,549,866 B1
(45) Date of Patent: Feb. 4, 2020

(54) POSITION LIGHTS AS DIRECTION CHANGE SIGNALS

(71) Applicant: GOODRICH LIGHTING SYSTEMS, INC., Oldsmar, FL (US)

(72) Inventors: Philippe Lapujade, Chandler, AZ (US); Andre Hessling von Heimendahl, Koblenz (DE)

(73) Assignee: GOODRICH LIGHTING SYSTEMS, Oldsmar, FL (US)

( * ) Notice: Subject to any disclaimer, the term of this patent is extended or adjusted under 35 U.S.C. 154(b) by 0 days.

(21) Appl. No.: 16/279,498

(22) Filed: Feb. 19, 2019

(51) Int. Cl.
| | | |
|---|---|---|
| *B64D 47/06* | (2006.01) | |
| *G08B 5/38* | (2006.01) | |
| *G08G 5/04* | (2006.01) | |
| *H05B 41/34* | (2006.01) | |
| *G08G 5/00* | (2006.01) | |

(52) U.S. Cl.
CPC ............ *B64D 47/06* (2013.01); *G08B 5/38* (2013.01); *G08G 5/0056* (2013.01); *G08G 5/045* (2013.01); *H05B 41/34* (2013.01)

(58) Field of Classification Search
CPC .......... B64D 47/06; G08B 5/38; G08G 5/045; G08G 5/0056; G01S 2013/9314
USPC ........................................................ 340/982
See application file for complete search history.

(56) References Cited

U.S. PATENT DOCUMENTS

| | | | |
|---|---|---|---|
| 2,832,059 A | 4/1958 | Adler, Jr. | |
| 2,960,679 A | 11/1960 | Atkins | |
| 3,031,645 A | 4/1962 | Koontz | |
| 3,903,501 A | 9/1975 | Greenlee et al. | |
| 6,486,798 B2 * | 11/2002 | Rast ................... | B64D 47/04 340/435 |
| 8,956,023 B1 * | 2/2015 | Hessling Von Heimendahl ......... | B64D 47/02 362/470 |
| 9,745,079 B2 * | 8/2017 | Jha .................. | G02B 27/0955 |
| 9,889,948 B2 * | 2/2018 | Hessling von Heimendahl ......... | B64D 47/02 |
| 10,053,231 B2 * | 8/2018 | Lapujade ............. | B64F 1/002 |
| 2014/0142786 A1 * | 5/2014 | Huang ................ | B60Q 1/40 701/2 |

* cited by examiner

*Primary Examiner* — John A Tweel, Jr.
(74) *Attorney, Agent, or Firm* — Snell & Wilmer, L.L.P.

(57) ABSTRACT

An aircraft may include a first pair of forward-facing flash position lamps disposed at a first wing tip, the first pair of flash position lamps comprising a first flash position lamp and a second flash position lamp, a second pair of forward-facing flash position lamps disposed at a second wing tip, the second pair of flash position lamps comprising a third flash position lamp and a fourth flash position lamp, and a controller in electronic communication with the first pair of flash position lamps, wherein at least one of the first flash position lamp and the second flash position lamp are configured to flash, while maintaining a combined intensity of the first pair of forward-facing flash position lamps above a desired intensity, to indicate a change in direction of the aircraft.

20 Claims, 4 Drawing Sheets

POSITION LIGHTS AS DIRECTION CHANGE SIGNALS

FIELD

The present disclosure relates to position lights for aircraft, and more particularly, to signaling systems for indicating a change in direction of travel of aircraft.

BACKGROUND

Aircraft are generally equipped with position lights. A position light system includes forward pointing lights mounted at each wingtip and a rear pointing white light (mounted on wingtips or tail). The lights are generally operated in continuous mode, and together provide visual information on aircraft position and heading through color identification to help reduce the risk of collision.

SUMMARY

An aircraft is disclosed, comprising a first pair of forward-facing flash position lamps disposed at a first wing tip, the first pair of flash position lamps comprising a first flash position lamp and a second flash position lamp, a second pair of forward-facing flash position lamps disposed at a second wing tip, the second pair of flash position lamps comprising a third flash position lamp and a fourth flash position lamp, and a controller in electronic communication with the first pair of flash position lamps, wherein at least one of the first flash position lamp and the second flash position lamp are configured to flash, while maintaining a combined intensity of the first pair of forward-facing flash position lamps above a desired intensity, to indicate a change in direction of the aircraft.

In various embodiments, the desired intensity in a line of flight of the aircraft is greater than 40 candela.

In various embodiments, the controller is configured to alternate power between the first flash position lamp and the second flash position lamp to indicate the change in direction of the aircraft.

In various embodiments, a first light output of the first flash position lamp is in the form of a first waveform comprising a first period and a first duty cycle, and a second light output of the second flash position lamp is in the form of a second waveform comprising a second period and a second duty cycle, wherein the first period is equal to the second period and the first duty cycle is less than the second duty cycle.

In various embodiments, the controller is configured to power the first flash position lamp in a continuous mode and the second flash position lamp in a flashing mode to indicate the change in direction of the aircraft.

In various embodiments, the aircraft further comprises a rear-facing flash position lamp, wherein the rear-facing flash position lamp is configured to flash to indicate the change in direction of the aircraft.

In various embodiments, the aircraft further comprises a sensor in electronic communication with the controller for control of the first pair of forward-facing flash position lamps, wherein controller detects the change in direction of the aircraft via the sensor and the controller controls the first pair of forward-facing flash position lamps in response to detecting the change in direction.

An aircraft is disclosed, comprising a first forward-facing flash position lamp disposed at a first wing tip, a second forward-facing flash position lamp disposed at a second wing tip, and a controller in electronic communication with the first flash position lamp, wherein the first flash position lamp is configured to flash while maintaining an intensity of the first forward-facing flash position lamp above a desired intensity to indicate a change in direction of the aircraft.

In various embodiments, the desired intensity in a line of flight of the aircraft is greater than 40 candela.

In various embodiments, a first light output of the first forward-facing flash position lamp is in the form of a first waveform comprising a first period and a first duty cycle, and a second light output of the first forward-facing flash position lamp is in the form of a second waveform comprising a second period and a second duty cycle, wherein the first period is equal to the second period and the first duty cycle is less than the second duty cycle.

In various embodiments, the controller is configured to power the first forward-facing flash position lamp in a flashing mode and the second forward-facing flash position lamp in a continuous mode to indicate the change in direction of the aircraft.

In various embodiments, the controller is configured to power the first forward-facing flash position lamp in a flashing mode and the second forward-facing flash position lamp in a flashing mode to indicate the change in direction of the aircraft.

In various embodiments, the aircraft further comprises a rear-facing flash position lamp, wherein the rear-facing flash position lamp is configured to flash to indicate the change in direction of the aircraft.

In various embodiments, the aircraft further comprises a sensor in electronic communication with the controller for control of the first forward-facing flash position lamp, wherein the controller detects the change in direction of the aircraft via the sensor and the controller controls the first forward-facing flash position lamp in response to detecting the change in direction.

In various embodiments, the controller is configured to vary an output intensity of the first forward-facing flash position lamp between a first value which is greater than the desired intensity and a second value which is greater than first value in a flashing mode.

A method for signaling a change in direction for an aircraft is disclosed, comprising powering a first forward-facing flash position lamp disposed at a wing tip in a continuous ON mode before the change in direction, maintaining a second forward-facing flash position lamp disposed at the wing tip in a continuous OFF mode before the change in direction, and powering a second forward-facing flash position lamp disposed at the wing tip in a flashing mode in response to the change in direction.

In various embodiments, the first forward-facing flash position lamp is powered at a constant output intensity, the constant output intensity is greater than a desired intensity.

In various embodiments, the desired intensity in a line of flight of the aircraft is greater than 40 candela.

In various embodiments, the second forward-facing flash position lamp is powered at an output intensity greater than the desired intensity.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "flash position lamp" refers to a position lamp which is capable of being flashed—i.e., flash-capable—and may be operated in a continuous mode and/or a flashing mode.

Disclosed herein is a flash position lamp system for signaling a change, or desired change, in direction of an aircraft. Flash position lamps may blink or flash to communicate an intended or actual direction change to other aircrafts and observers, therefore enhancing safety during flights and ground operations.

A flash position lamp system, as disclosed herein, may have particular application for ground operations (taxing). A flash position lamp system, as disclosed herein, may use two separate flash position lights on each side (most commercial aircrafts have two forward position lights on each side for redundancy). The flash position lamps may blink/flash so that there is always one light one on, therefore meeting the federal aviation regulation (FAR) requirement of continuous operation (as a pair). The rear-facing flash position lamp can also blink/flash and use a blink/flash pattern to indicate direction. From example, a blink for right turns and two successive blinks for left turns.

Figure 1:
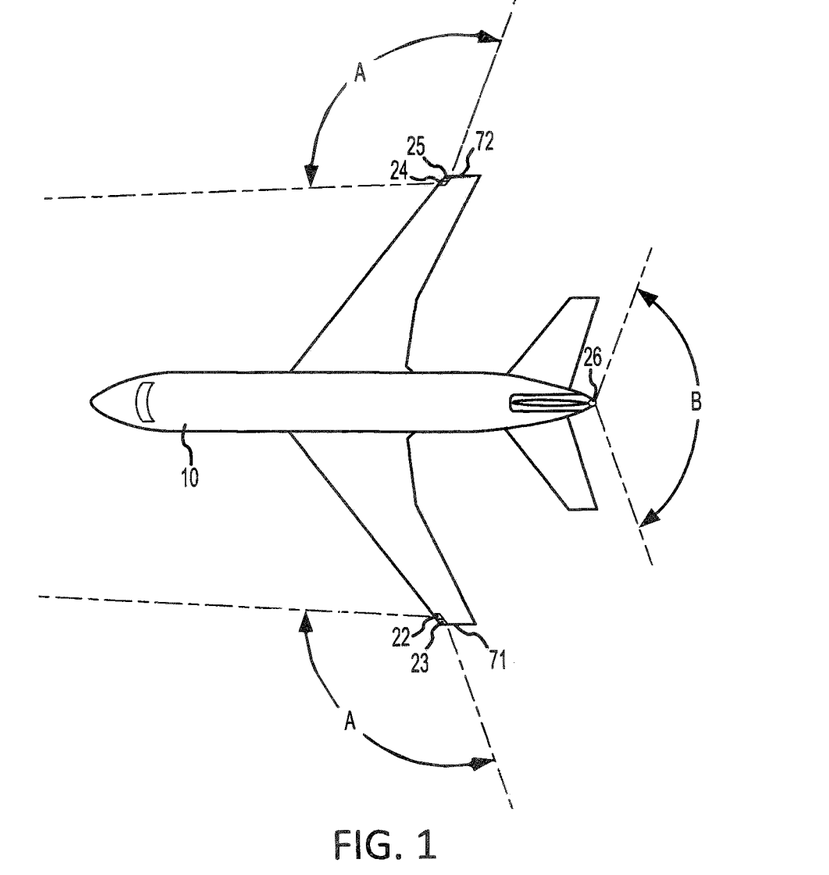
FIG. 1 illustrates a plan view showing an aircraft and the location of the flash position lamps employed in connection with the present disclosure, in accordance with various embodiments.

With reference to FIG. 1, an aircraft 10 is provided with a plurality of flash position lamps for the purpose of aiding in identification and recognition of the aircraft while in flight, as well as aiding in identification and recognition of a direction of travel, or a change in the direction of travel, of the aircraft while in flight or on the ground. These flash position lamps may comprise the position lamps required by government regulations. These position lights may comprise red and green lamps on the left and right wing tips, respectively. These position lights may comprise a white lamp on the tail of the aircraft. A first pair of forward-facing flash position lamps 22, 23 is mounted on a first wing tip 71 and a second pair of forward-facing flash position lamps 24, 25 is mounted on a second wing tip 72. A rear-facing flash position lamp 26 is mounted on the tail of the aircraft.

The forward-facing flash position lamps 22, 23 and 24, 25 are so mounted on the wing tips so that they may be seen by an observer positioned anywhere in the arc A shown in FIG. 1. The rear-facing flash position lamp 26 is so mounted that they may be seen by an observer positioned anywhere in the arc B shown in FIG. 1.

In various embodiments, forward-facing flash position lamps 22, 23 may each emit a light comprising a first color, such as red for example. In various embodiments, forward-facing flash position lamps 24, 25 may each emit a light comprising a second color, such as green for example. Rear-facing flash position lamp 26 may emit a light comprising a third color, such as white for example.

Figure 2:
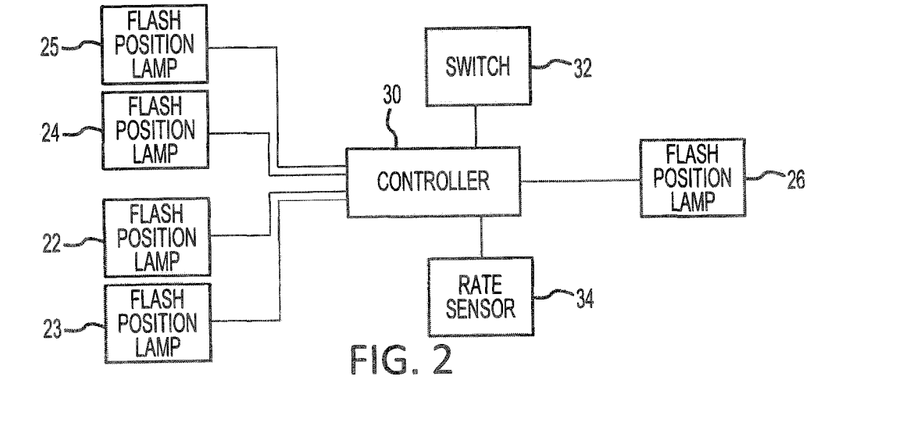
FIG. 2 illustrates an electrical block diagram showing the relationship of a controller and the flash position lamps, in accordance with various embodiments.

All the flash position lamps may be operated under the control of a controller 30, shown in FIG. 2. In this regard, flash position lamps 22, 23, 24, 25, 26 may be in electronic communication with controller 30 via one or more wires, or the like. Controller 30 may implement a timing circuit for providing individual input signals to each flash position lamp 22, 23, 24, 25, 26. Controller 30 may control each flash position lamp 22, 23, 24, 25, 26 individually via separate power signals. In this regard, controller 30 may comprise five outputs, two of which are connected to flash position lamps 22, 23 (also referred to herein as first and second flash position lamps), respectively, two of which are connected to flash position lamps 24, 25 (also referred to herein as third and fourth flash position lamps), respectively, and one of which is connected to flash position lamp 26. The outputs of controller 30 may take various forms as described herein.

Controller 30 may include one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The following description provides a method for controlling flash position lamps 22, 23 in the context of a left-hand turn. Systems and methods are described primarily with respect to flash position lamps 22, 23 during left-hand turns in order to reduce redundancy and improve overall clarity of the detailed description. It should be noted that control of flash position lamps 24, 25 for a right-hand turn is similar to that of flash position lamps 22, 23 for left-hand turns.

In various embodiments, controller 30 may detect the change, or desired change, in direction of travel via a switch 32 (e.g., located in the cockpit). For example, a pilot may actuate switch 32 to send a signal to controller 30 indicating a change in direction of travel of aircraft 10. In various embodiments, controller 30 may automatically detect the change, or desired change, in direction of travel via a sensor 34 mounted on aircraft 10. For example, controller 30 may monitor sensor 34 to detect a rotation about an axis of aircraft 10. In various embodiments, sensor 34 is a yaw rate sensor for detecting an angular velocity around a vertical axis of aircraft 10. Sensor 34 may be a gyroscopic device. Sensor 34 may be a piezoelectric sensor. Sensor 34 may be a micromechanical capacitive sensor.

In various embodiments, controller 30 may be mounted locally at wing tip 71. In this manner, flash position lamps 22, 23 and controller 30 may be retrofittable. It is contemplated that one or more controllers 30 may be utilized for control of the flash position lamps. For example, a first controller 30 may be disposed locally with flash position lamps 22, 23, a second controller 30 may be disposed locally with flash position lamps 24, 25, and a third controller 30 may be disposed locally with flash position lamp 26.

In various embodiments, controller 30 may be configured to control the power (e.g., an input signal) supplied to flash position lamps 22, 23. The power received by flash position lamp 22 or flash position lamp 23 may take one of two forms as illustrated by waveforms 301, 302 in FIG. 3. The state of each flash position lamp 22, 23 may be determined by a change in direction of travel, or a desired change in direction of travel, of aircraft 10.

Figure 3:
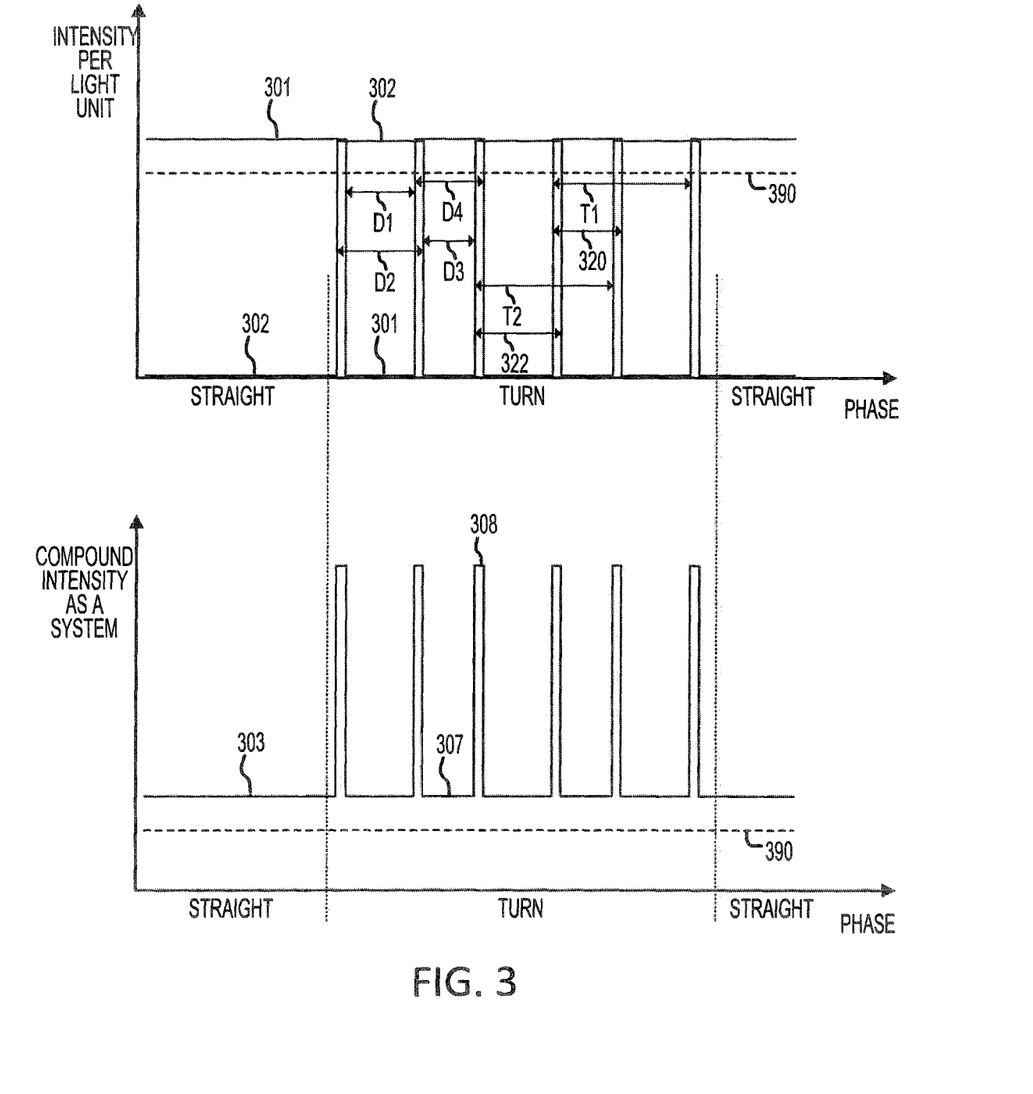
FIG. 3 illustrates plots of a light intensity output for first and second flash position lamps for straight travel and during a turn, in accordance with various embodiments.

With combined reference to FIG. 2 and FIG. 3, flash position lamp 23 may be continuously powered on in response to aircraft 10 traveling straight, as illustrated by waveform 301 (also referred to herein as a first waveform). Flash position lamp 22 may be continuously powered off in response to aircraft 10 traveling straight, as illustrated by waveform 302. However, during a turning maneuver, the input signal sent to flash position lamp 22 may be pulsed, as shown by waveform 302 (also referred to herein as a second waveform). Similarly, during a turning maneuver, the input signal sent to flash position lamp 23 may be pulsed, as shown by waveform 301. Waveform 301 and waveform 302 alternate between HIGH and LOW values such that at least one of waveform 301 and waveform 302 is HIGH at all times. In this manner, an intensity output at the left wing tip, via flash position lamps 22, 23 is greater than a desired intensity 390. In various embodiments, desired intensity 390 may be measured in units of candela. In various embodiments, the desired intensity 390 may be a federal aviation regulation (FAR) requirement. In various embodiments, the desired intensity 390 in the direction of flight is 40 candela. In various embodiments, the desired intensity 390 in the aft direction is 20 candela. In various embodiments, the term "desired intensity" as used herein may refer to a maximum intensity of a flash position light when viewed from an angle of zero degrees from the longitudinal axis of the aircraft—i.e., in the line of flight of the aircraft.

In various embodiments, in response to controller 30 detecting a change, or desired change, in direction of aircraft 10, waveform 302 may sharply increase (e.g., step) to a HIGH value to increase a light intensity of flash position lamp 22 above the desired intensity 390. Both waveform 301 and waveform 302 may be HIGH for a short duration, such as between 50 and 400 milliseconds for example, and then waveform 301 may sharply decrease (e.g., step) to a LOW value (e.g., zero volts) for a duration D1. In various embodiments, duration D1 may be between 100 and 1000 milliseconds. In various embodiments, duration D1 may be between 200 and 700 milliseconds. In various embodiments, duration D1 may be between 200 and 500 milliseconds. After duration D1, waveform 301 may sharply increase (e.g., step) to a HIGH value to increase a light intensity of flash position lamp 23 above the desired intensity 390 for a duration D4. Both waveform 301 and waveform 302 may again be HIGH for a short duration, and then waveform 302 may sharply decrease (e.g., step) to a LOW value (e.g., zero volts) for a duration D3. Accordingly, waveform 302 may be HIGH for a duration D2. Duration D2 may be greater than duration D1. Duration D3 may be less than duration D2. Duration D3 may be less than duration D1. In this manner, controller 30 causes flash position lamps 22, 23 to flash in an alternating pattern, while maintaining a light intensity above the desired intensity.

In various embodiments, waveform 301 may comprise pulse train comprising a first period T1 and a first duty cycle 320. Waveform 302 may comprise pulse train comprising a second period T2 and a second duty cycle 322. In various embodiments, first period T1 is equal to second period T2. In various embodiments, first duty cycle 320 is less than second duty cycle 322.

At relatively close distances (e.g., within one hundred yards (91.44 m)) from aircraft 10, an observer may appreciate the change in location of the source of light (i.e., between flash position lamp 22 and flash position lamp 23) which may be located within inches (e.g., between six and forty-eight inches (15.24 cm-121.92 cm)) of each other. However, at relatively far distances (e.g., beyond one hundred yards (91.44 m)) from aircraft 10, it may be difficult for an observer to appreciate the change in location of the source of light (i.e., between flash position lamp 22 and flash position lamp 23). However, as illustrated by waveform 303, the compound intensity as the system of lights (i.e., the combined intensity of flash position lamp 22 and flash position lamp 23) may generate pulse waves comprising a sum of the intensities of light generated by flash position lamp 22 and flash position lamp 23 which may be appreciated at relatively far distances. In this manner, waveform 303 is always above the desired intensity 390. In this regard, the overlapping portions of waveforms 301, 302 generate pulses comprising the sum of waveform 301 and 302. Stated differently, the overlapping durations of light emitted from flash position lamp 22 and flash position lamp 23 generate pulses of light intensity comprising the sum of the intensity of light emitted from flash position lamp 22 and flash position lamp 23.

Figure 4:
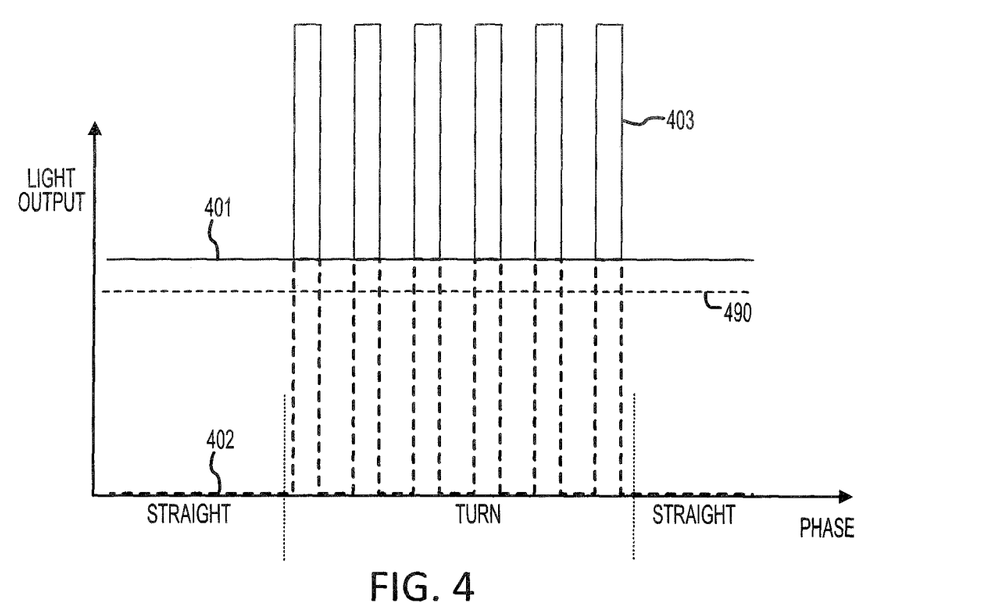
FIG. 4 illustrates a plot of a light intensity output for first and second flash position lamps for continuous flashing, in accordance with various embodiments.

With combined reference to FIG. 2 and FIG. 4, flash position lamp 23 may be continuously powered on in response to aircraft 10 traveling straight, as illustrated by waveform 401. Flash position lamp 22 may be continuously powered off in response to aircraft 10 traveling straight, as illustrated by waveform 402. Stated differently, controller 30 may be configured to power flash position lamp 23 in a continuous ON mode (i.e., turned on) before a change in direction, and may be configured to operate flash position lamp 22 in a continuous OFF mode (i.e., turned off) before the change in direction (see waveforms 401, 402 during the straight phase of FIG. 4). However, during a turning maneuver, the input signal sent to flash position lamp 22 may be pulsed, as shown by waveform 402, while the input signal sent to flash position lamp 23 may remain constant, as shown by waveform 401. In this manner, a combined intensity output at the left wing tip, via flash position lamps 22, 23, as illustrated by waveform 403, is greater than a desired intensity 490. In various embodiments, desired intensity 490 may be measured in units of candles. In various embodiments, the desired intensity 490 may be a federal aviation regulation (FAR) requirement. In various embodiments, in response to controller 30 detecting a change, or desired change, in direction of aircraft 10, waveform 402 may take the form of a pulse train. In various embodiments, a period of pulse waveform 402 is constant.

Figure 5:
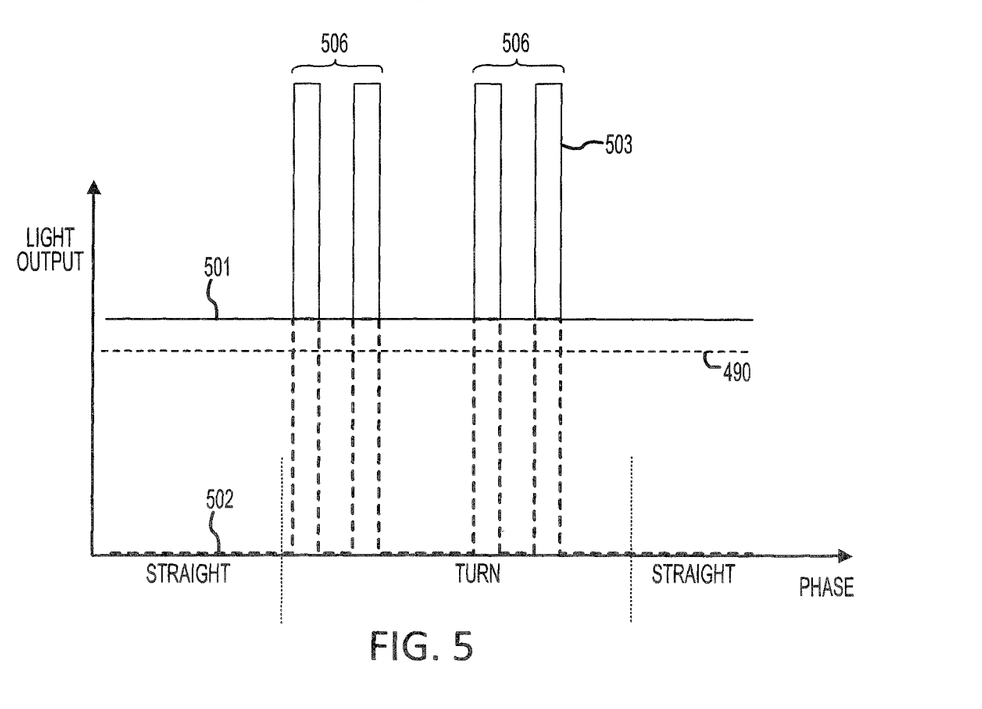
FIG. 5 illustrates a plot of a light intensity output for first and second flash position lamps for double flashing, in accordance with various embodiments.

With combined reference to FIG. 2 and FIG. 5, flash position lamp 23 may be continuously powered on in response to aircraft 10 traveling straight, as illustrated by waveform 501. Flash position lamp 22 may be continuously powered off in response to aircraft 10 traveling straight, as illustrated by waveform 502. However, during a turning maneuver, the input signal sent to flash position lamp 22 may be pulsed, as shown by waveform 502, while the input signal sent to flash position lamp 23 may remain constant, as shown by waveform 501. In this manner, a combined intensity output at the left wing tip, via flash position lamps 22, 23, as illustrated by waveform 503, is greater than a desired intensity 590. In various embodiments, desired intensity 590 may be measured in units of candles. In various embodiments, the desired intensity 590 may be a federal aviation regulation (FAR) requirement. In various embodiments, in response to controller 30 detecting a change, or desired change, in direction of aircraft 10, waveform 502 may take the form of a pulse train. In various embodiments, a period of pulse waveform 502 varies, for example, to create paired pulses 506.

In various embodiments, with reference to FIG. 4 and FIG. 5, waveforms 501, 502 may be used for flash position lamps 22, 23 to indicate a left-hand turn and waveforms 401, 402 may be used for flash position lamps 24, 25 to indicate a right-hand turn. In this manner, an observer may recognize the change in direction by either a constant flashing (waveform 402), thereby indicating a left-hand turn, or a double flashes (waveform 502), thereby indicating a right-hand turn. It should be noted that it is contemplated herein that a constant flash (waveform 402) may be used to indicate a right-hand turn and a double flash (waveform 502) may be used to indicate a left-hand turn, and vice-versa.

Furthermore, by using a flash pattern (e.g., constant flashes, double flashes, etc.), waveforms 501, 502 may be used for flash position lamps 22, 23, 24, 25, 26 to indicate a left-hand turn and waveforms 401, 402 may be used for flash position lamps 22, 23, 24, 25, 26 to indicate a right-hand turn, and vice-versa. In this regard, instead of flashing only the left wing-tip flash position lamps 22, 23 to indicate a left-hand turn (or flashing only the right wing-tip flash position lamps 24, 25 to indicate a right-hand turn), all of the flash position lamps 22, 23, 24, 25, 26 may be used to provide an indication of a change in heading, thereby broadcasting the turn signal to a broader field of view. Furthermore, by using a flash pattern (e.g., constant flashes, double flashes, etc.) an observer need to recognize which side of the aircraft the signal is coming from, but can determine the change in heading simply by recognizing a pre-determined pattern.

It is noted that the waveforms illustrated in FIGS. 3-5 may represent both the form of the input signal sent to the flash position lamps, as well as a light intensity output from the respective flash position lamp.

Figure 6:
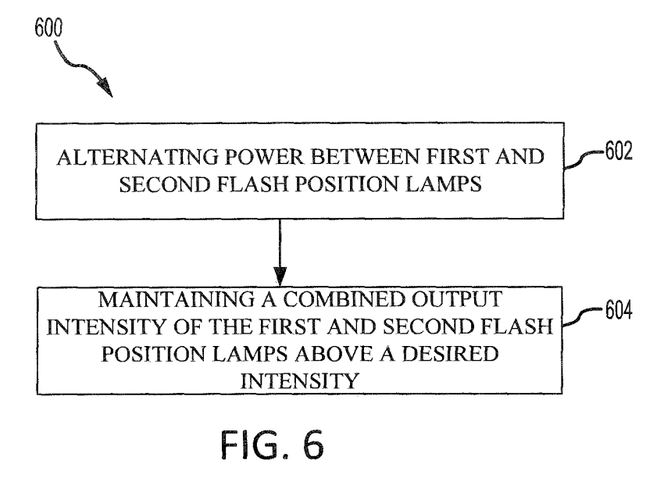
FIG. 6 and FIG. 7 illustrate methods for signaling a change in direction for an aircraft, in accordance with various embodiments.

With reference to FIG. 6, a method 600 for signaling a change in direction for an aircraft is provided, in accordance with various embodiments. Method 600 includes alternating power between first and second flash position lamps (step 602). Method 600 includes maintaining a combined output intensity of the first and second flash position lamps above a desired intensity (step 604).

With combined reference to FIG. 1, FIG. 2, FIG. 3, and FIG. 6, step 602 may include alternating electric power (i.e., via electric current and/or voltage) between first and second flash position lamps 22, 23. Step 604 may include continuously maintaining the combined output intensity (i.e., the sum of the light output intensity of flash position lamps 22, 23) of first and second flash position lamps 22, 23 above desired intensity 390. Step 602 and step 604 may be performed simultaneously.

Figure 7:
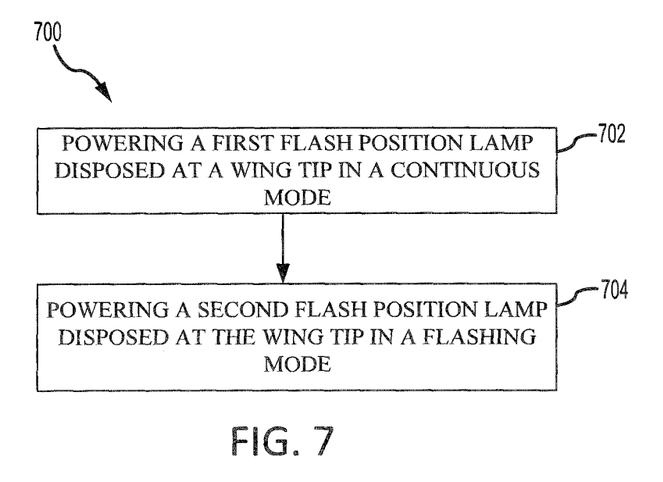

With reference to FIG. 7, a method 700 for signaling a change in direction for an aircraft is provided, in accordance with various embodiments. Method 700 includes powering a first flash position lamp disposed at a wing tip in a continuous mode (step 702). Method 700 includes powering a second flash position lamp disposed at the wing tip in a flashing mode (step 704).

With combined reference to FIG. 1, FIG. 2, FIG. 4, FIG. 5, and FIG. 7, step 702 may include powering first flash position lamp 22 disposed at wing tip 71 in a continuous mode. The term "continuous mode," as used herein, may refer to a constant output intensity of a flash position lamp, as illustrated by waveform 401. Step 704 may include powering second flash position lamp 23 disposed at the wing tip 71 in a flashing mode. The term "flashing mode," as used herein, may refer to a varying output intensity of a flash position lamp, commonly referred to as "flashing" or "blinking." The flashes may be uniform as illustrated by waveform 402 or may be clustered as illustrated by waveform 502. In this manner, the combined light output intensity is perceived as flashing, while maintaining the combined light output intensity above the desired intensity 490.

Having described various methods for indicating a change in direction of an aircraft using a pair of flash position lamps disposed at each wing tip, it is further contemplated that a single flash position lamp (one at each wing tip) may be used for indicating a change in direction of the aircraft. With combined reference to FIG. 1 and FIG. 3, a method for signaling a change in direction for an aircraft may be similar to the methods described herein, except that both input signals (e.g., waveforms 301, 302, waveforms 401, 402 (see FIG. 4), and waveforms 501, 502 (see FIG. 5)) are supplied to a single flash position lamp. In this regard, a method for signaling a change in direction for an aircraft may include controlling flash position lamp 22 and flash position lamp 24 for indicating either a left or right turn. Flash position lamp 22 or flash position lamp 24 may be configured to flash such that the output intensity is similar to that of waveform 303. In this regard, the output intensity may be varied between a first value 307 which is greater than desired intensity 390 and a second value 308 which is greater than first value 307. In this regard, flash position lamp 22 and/or flash position lamp 24 may be operated in a flashing mode while maintaining the output intensity of flash position lamp 22 and/or flash position lamp 24 above output intensity 390. Flash position lamp 22 and/or flash position lamp 24 may similarly be operated to flash as illustrated by waveform 403 of FIG. 4 and/or waveform 503 as illustrated in FIG. 5, as described herein.

As described herein, flash position lamp 22 may be operated in a flashing mode and flash position lamp 24 may be operated in continuous mode to indicate the change in direction of the aircraft, or both flash position lamp 22 and flash position lamp 24 may be operated in a flashing mode to indicate the change in direction of the aircraft (e.g., see FIG. 4 and FIG. 5).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft, comprising:
a first pair of forward-facing flash position lamps disposed at a first wing tip, the first pair of flash position lamps comprising a first flash position lamp and a second flash position lamp;
a second pair of forward-facing flash position lamps disposed at a second wing tip, the second pair of flash position lamps comprising a third flash position lamp and a fourth flash position lamp; and
a controller in electronic communication with the first pair of flash position lamps, wherein at least one of the first flash position lamp and the second flash position lamp are configured to flash, while maintaining a combined intensity of the first pair of forward-facing flash position lamps above a desired intensity, to indicate a change in direction of the aircraft.

2. The aircraft of claim 1, wherein the desired intensity in a line of flight of the aircraft is greater than 40 candela.

3. The aircraft of claim 1, wherein the controller is configured to alternate power between the first flash position lamp and the second flash position lamp to indicate the change in direction of the aircraft.

4. The aircraft of claim 1, wherein a first light output of the first flash position lamp is in the form of a first waveform comprising a first period and a first duty cycle, and a second light output of the second flash position lamp is in the form of a second waveform comprising a second period and a second duty cycle, wherein the first period is equal to the second period and the first duty cycle is less than the second duty cycle.

5. The aircraft of claim 1, wherein the controller is configured to power the first flash position lamp in a continuous mode and the second flash position lamp in a flashing mode to indicate the change in direction of the aircraft.

6. The aircraft of claim 1, further comprising a rear-facing flash position lamp, wherein the rear-facing flash position lamp is configured to flash to indicate the change in direction of the aircraft.

7. The aircraft of claim 1, further comprising a sensor in electronic communication with the controller for control of the first pair of forward-facing flash position lamps, wherein the controller detects the change in direction of the aircraft via the sensor.

8. The aircraft of claim 7, wherein the controller controls the first pair of forward-facing flash position lamps in response to detecting the change in direction.

9. An aircraft, comprising:
a first forward-facing flash position lamp disposed at a first wing tip;

a second forward-facing flash position lamp disposed at a second wing tip; and a controller in electronic communication with the first flash position lamp, wherein the first flash position lamp is configured to flash while maintaining an intensity of the first forward-facing flash position lamp above a desired intensity to indicate a change in direction of the aircraft.

10. The aircraft of claim 9, wherein the desired intensity in a line of flight of the aircraft is greater than 40 candela.

11. The aircraft of claim 9, wherein a first light output of the first forward-facing flash position lamp is in the form of a first waveform comprising a first period and a first duty cycle, and a second light output of the first forward-facing flash position lamp is in the form of a second waveform comprising a second period and a second duty cycle, wherein the first period is equal to the second period and the first duty cycle is less than the second duty cycle.

12. The aircraft of claim 9, wherein the controller is configured to power the first forward-facing flash position lamp in a flashing mode and the second forward-facing flash position lamp in a continuous mode to indicate the change in direction of the aircraft.

13. The aircraft of claim 9, wherein the controller is configured to power the first forward-facing flash position lamp in a flashing mode and the second forward-facing flash position lamp in a flashing mode to indicate the change in direction of the aircraft.

14. The aircraft of claim 9, further comprising a rear-facing flash position lamp, wherein the rear-facing flash position lamp is configured to flash to indicate the change in direction of the aircraft.

15. The aircraft of claim 9, further comprising a sensor in electronic communication with the controller for control of the first forward-facing flash position lamp, wherein the controller detects the change in direction of the aircraft via the sensor and the controller controls the first forward-facing flash position lamp in response to detecting the change in direction.

16. The aircraft of claim 9, wherein the controller is configured to vary an output intensity of the first forward-facing flash position lamp between a first value which is greater than the desired intensity and a second value which is greater than first value in a flashing mode.

17. A method for signaling a change in direction for an aircraft, comprising:

powering a first forward-facing flash position lamp disposed at a wing tip in a continuous ON mode before the change in direction;

maintaining a second forward-facing flash position lamp disposed at the wing tip in a continuous OFF mode before the change in direction; and powering a second forward-facing flash position lamp disposed at the wing tip in a flashing mode in response to the change in direction.

18. The method of claim 17, wherein the first forward-facing flash position lamp is powered at a constant output intensity, the constant output intensity is greater than a desired intensity.

19. The method of claim 18, wherein the desired intensity in a line of flight of the aircraft is greater than 40 candela.

20. The method of claim 18, wherein the second forward-facing flash position lamp is powered at an output intensity greater than the desired intensity.

* * * * *